US009638080B2

(12) United States Patent
Cavanagh et al.

(10) Patent No.: US 9,638,080 B2
(45) Date of Patent: May 2, 2017

(54) INJECTOR HAVING SWIRL STRUCTURE DOWNSTREAM OF VALVE SEAT (71) Applicant: Stanadyne Corporation, Windsor, CT (US)

(72) Inventors: Mark S. Cavanagh, West Granby, CT (US); Robert G. Lucas, Ellington, CT (US)

(73) Assignee: Stanadyne LLC, Windsor, CT (US)

( * ) Notice: Subject to any disclaimer, the term of this patent is extended or adjusted under 35 U.S.C. 154(b) by 539 days.

(21) Appl. No.: 14/020,297

(22) Filed: Sep. 6, 2013

(65) Prior Publication Data

US 2014/0008465 A1 Jan. 9, 2014

Related U.S. Application Data (63) Continuation of application No. 12/456,063, filed on Jun. 11, 2009, now abandoned.

(51) Int. Cl.
| | |
|---|---|
| *B05B 1/34* | (2006.01) |
| *F02M 61/00* | (2006.01) |
| *F01N 3/20* | (2006.01) |
| *F02M 61/16* | (2006.01) |
| *F01N 3/021* | (2006.01) |

(52) U.S. Cl.
CPC .......... *F01N 3/2066* (2013.01); *B05B 1/3436* (2013.01); *B05B 1/3447* (2013.01); *F02M 61/162* (2013.01); *F01N 3/021* (2013.01); *F01N 2610/02* (2013.01); *F01N 2610/1453* (2013.01); *F02M 61/163* (2013.01); *Y02T 10/24* (2013.01)

(58) Field of Classification Search
CPC ... B05B 1/3436; B05B 1/3447; F01N 3/2066; F01N 3/021; F01N 2610/02; F01N 2610/1453; F02M 61/162; F02M 61/163; Y02T 10/24
USPC .................... 239/490, 533.12, 436, 494, 496
See application file for complete search history.

(56) References Cited

U.S. PATENT DOCUMENTS

| | | | | |
|---|---|---|---|---|
| 4,520,962 A | * | 6/1985 | Momono | F02M 51/0675 239/488 |
| 5,484,108 A | * | 1/1996 | Nally | F02M 61/1853 239/553.3 |
| 5,785,254 A | * | 7/1998 | Zimmermann | F02M 61/162 239/490 |
| 6,755,347 B1 | * | 6/2004 | Holz | F02M 61/162 239/491 |
| 6,796,516 B2 | * | 9/2004 | Maier | F02M 51/0671 239/467 |

(Continued)

*Primary Examiner* — Arthur O Hall
*Assistant Examiner* — Steven M Cernoch
(74) *Attorney, Agent, or Firm* — Alix, Yale & Ristas, LLP (57) ABSTRACT An atomizing injector comprises a body having a central bore with a valve situated in the bore, leading to a chamber. An actuator moves the valve between closed condition and open conditions, selectively exposing the chamber to a flow of pressurized liquid. A discharge port extends from the chamber to a discharge orifice. A swirl element is situated in the chamber, while leaving a free space in the chamber immediately above the discharge port. When the valve is opened, liquid flows into the chamber, through the swirl element into the space, forming a whirl in the space before passing through the discharge port and exiting the discharge orifice as an atomized whirling spray.

2 Claims, 11 Drawing Sheets (56) References Cited

U.S. PATENT DOCUMENTS

| | | | | |
|---|---|---|---|---|
| 6,823,833 B2* | 11/2004 | Ismailov | F02M 51/0678 | 123/299 |
| 6,824,085 B2* | 11/2004 | Sebastian | F02M 51/0671 | 239/486 |
| 6,851,629 B2* | 2/2005 | Stier | F02M 51/0671 | 239/533.12 |
| 6,886,758 B1* | 5/2005 | Wieczorek | F02M 51/0625 | 239/132.5 |
| 6,966,499 B2* | 11/2005 | Nally | F02M 51/0653 | 239/5 |
| 7,467,749 B2* | 12/2008 | Tarabulski | F01N 3/2066 | 239/132 |
| 8,225,602 B2* | 7/2012 | Cavanagh | F01N 3/2066 | 60/295 |
| 2005/0235632 A1* | 10/2005 | Tarabulski | F01N 3/2066 | 60/282 |
| 2007/0200007 A1* | 8/2007 | Stevens | B01J 2/16 | 239/7 |
| 2007/0228191 A1* | 10/2007 | Harmon | F01N 3/2066 | 239/533.2 |

* cited by examiner

INJECTOR HAVING SWIRL STRUCTURE DOWNSTREAM OF VALVE SEAT

RELATED APPLICATION

This is a Continuation of U.S. application Ser. No. 12/456,063 filed Jun. 11, 2009 for Injector Having Swirl Structure Downstream of Valve Seat.

BACKGROUND

The present invention is directed to equipment and process for treatment of exhaust gas from internal combustion engines, particularly the injection of a treatment liquid upstream of a selective catalytic reaction (SCR) converter.

U.S. Pat. No. 5,976,475, "Reducing NOx Emissions from an Engine by Temperature-Controlled Urea Injection for Selective Catalytic Reduction", describes a process in which a spray of urea solution is injected into the exhaust gas stream upstream of an SCR converter. The exhaust pipe or conduit becomes quite hot, and the ambient air surrounding the exhaust pipe is likewise quite hot. The urea solution must remain below the transition temperature of the urea solution, to avoid the formation of ammonia. The required temperature control proposed in said patent is to maintain circulation of the urea solution between the source and the injector, whether or not the injector is discharging into the exhaust. The continuous flow means that a given unit of urea solution volume that leaves the source at about 100 deg. C. is exposed to the hot injector environment for only a brief period, so it does not rise to the critical temperature of about 135 deg. C.

Publication No. US2005/0235632, "Methods and Apparatus for Injecting Atomized Fluid", discloses one such injector configuration, in which treatment liquid is continuously recirculated to and from a source, while a standing swirl is maintained in the lower portion of the injector bore, above the valve seat, such that upon a valve actuation signal the valve lifts from the seat and the liquid in the standing swirl passes through the discharge orifice as an atomized swirl, into the exhaust stream of the pipe.

SUMMARY

In accordance with the present disclosure, a swirl element is provided downstream of the valve seat, such that when the valve opens the pressurized fluid is forced to pass through the swirl element. This quickly produces a vigorous helical flow which upon exiting the swirl element enters a free space where the swirling liquid is consolidated while maintaining the swirl. The swirling liquid is then delivered through a narrow passage to the discharge orifice, where it emerges as a swirling, atomized spray.

In the preferred end use, the injector is mounted on a vehicle exhaust pipe, and has a body, a pressurized volume of treatment liquid within the body, and means operatively associated with the body for discharging the pressurized liquid into the exhaust pipe as an atomized swirl. The means for discharging the pressurized liquid comprises a chamber in fluid communication with the pressurized volume of treatment liquid, a valve between the chamber and the pressurized volume of treatment liquid, and a discharge port from the chamber to a discharge orifice. A swirl element is situated in the chamber, while leaving a substantially cylindrical free space immediately above the discharge port. When the valve is closed, no fluid can enter the chamber and when the valve is open, pressurized fluid flows into said chamber, through the swirl element into the space, forming a whirl in the space before passing through the discharge port and exiting the discharge orifice as an atomized whirling spray.

According to one aspect, the swirl element extends from the nose, of a needle valve, below the valve seat. A passage supplies fluid to the face upstream of the seat, whereby when the valve nose is seated in the closed condition, no fluid can enter the chamber and when the valve nose is lifted off the face, fluid flows through the swirl element into a space in the chamber, forming a whirl in the space before exiting through a discharge orifice as an atomized whirling spray.

Preferably, this swirl element is a substantially solid cylinder having an external diameter closely conforming to the diameter of the chamber, with a single or multiple external helical groove(s), such that substantially all flow to the discharge port in the valve open condition, first passes through the grooves.

In another embodiment, the extension on the nose has a uniform outer surface, with the helical grooves provided on the inner wall of the chamber or on the inner diameter of a hollow insert in the chamber.

In yet another embodiment, the valve nose does not have an extension. The swirl element is a solid member having a single or multiple external helical groove(s) that closely conforms to the chamber wall, such that substantially all flow to the discharge port in the valve open condition, first passes through the grooves. This embodiment is preferably press fitted against the wall of the chamber.

The valve can be a plate or disc type valve, with the body of the valve fixed in the bore of the body of the injector. An integral plug portion projects into a cylindrical chamber formed in an insert that is also fixed in the bore. Various types of flow channels can be provided on or through the plug, the chamber wall, or slots integrally formed on the plug or in a disc situated between the plug and the floor of the chamber.

BRIEF DESCRIPTION OF THE DRAWING

Embodiments of the invention will be described with reference to the accompanying drawing, in which.

DETAILED DESCRIPTION

Figure 1:
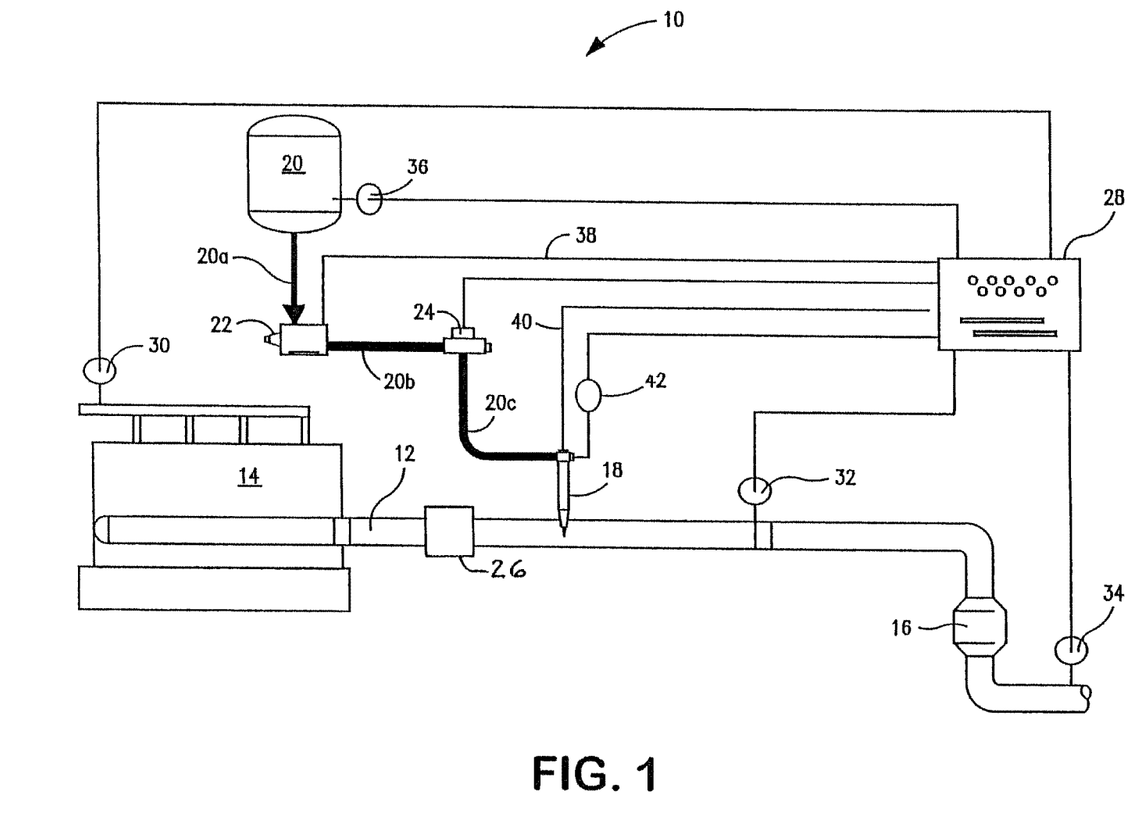
FIG. 1 is a schematic representation of a urea injection system connected to the exhaust line of an internal combustion engine.

FIG. 1 is a schematic of an SCR system 10, having an exhaust pipe 12 from an upstream internal combustion engine 14 and leading to a downstream SCR unit 16. A urea solution injector 18 is mounted on the pipe 12 upstream of the SCR unit, whereby an atomized spray is injected into the exhaust stream to assist in the chemical reactions for NOx reduction. In other embodiments for exhaust gas treatment, such injector could spray a hydrocarbon (HC). As used herein, "treatment liquid" encompasses all reagents such as urea solution, as well as other liquids such as HC. A diesel particulate trap or filter is shown at 26.

A source 20 of treatment liquid is located a sufficient distance from the injector 18 so as not to be unduly influenced by the high heat thrown off by the pipe 12 and present in the ambient air surrounding the pipe. In general, the temperature of the liquid in the source would be in the range of about 10-50 deg. C. depending on the weather conditions in which the vehicle is operated. A source line 20a, b, c including pump 22 supplies treatment liquid to the injector at a predetermined or controlled pressure, preferably in the range of about 5-10 bar. Pressure sensor 24 is optionally provided for this purpose. The pump 22 preferably has a built in pressure regulator to maintain the desired pressure.

The injector is controlled from controller 28, which may be dedicated (as shown) or optionally integrated with an engine control unit (ECU) or the like, whereby the rate of injection into the exhaust stream is commensurate with the rate of exhaust generated by the engine and other measured variables. Those skilled in the art are familiar with techniques for measuring engine variables such as fuel quantity at 30 and exhaust variables such as temperature at 32, and optionally residual $NO_x$, concentration at sensor 34, to determine the volumetric flow rate of treatment liquid to be injected at any given moment. This rate is associated with a first or normal mode of operation of both the injector 18 and the SCR unit 16. Other sensors may be provided for urea level and tank temperature at 36.

Figure 2:
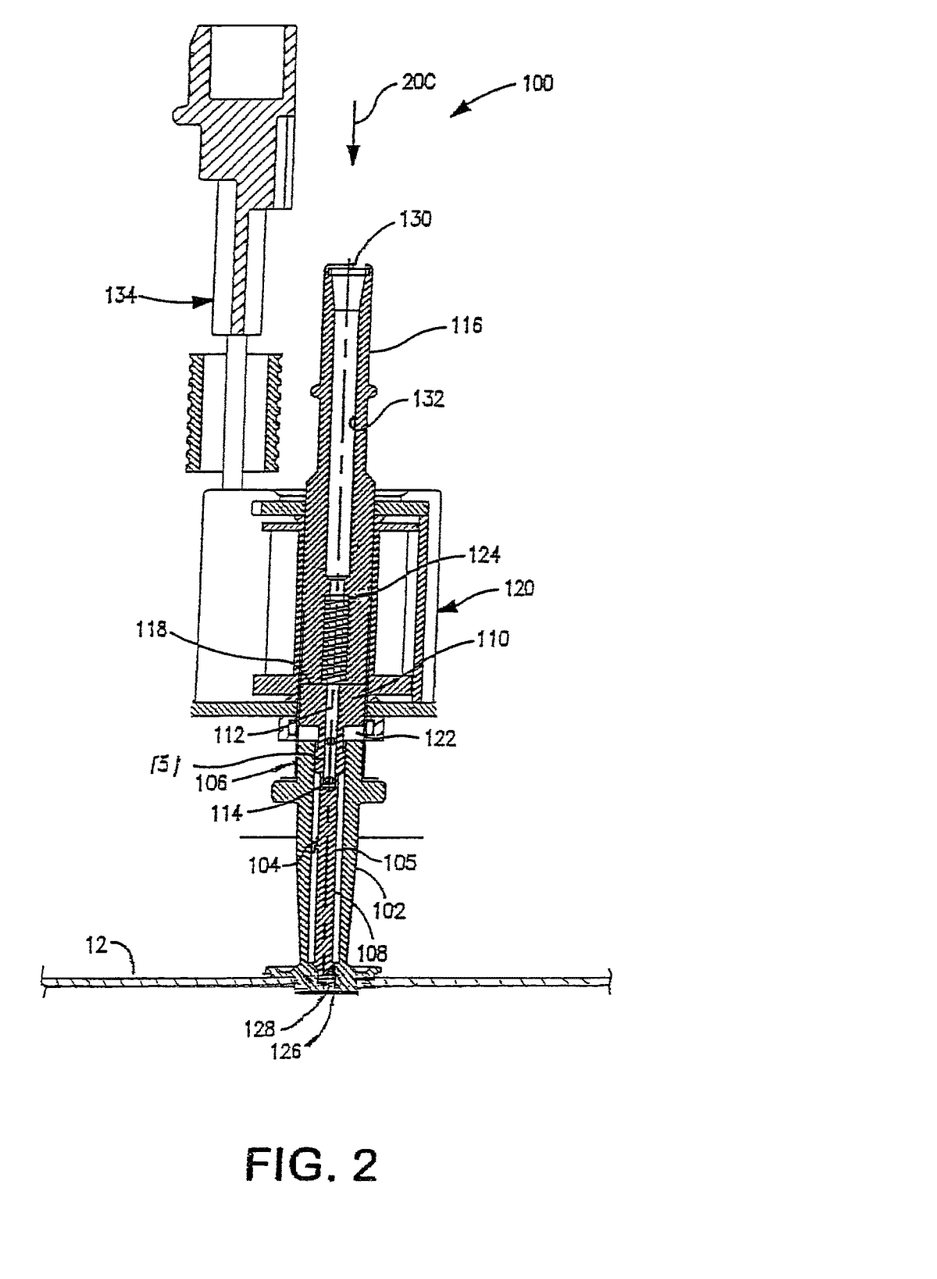
FIG. 2 is an elevation section view of an injector according to an aspect of the invention.

The preferred injector 18 of FIG. 1 is shown as 100 in FIG. 2. The injector 100 has an elongated body 102 with central bore 104. The body may have an integral upper extension 106 with a needle valve 108 extending through the extension and bore 104. Although a variety of techniques may be available for providing fluid to the annulus 105 formed in the bore 104 between the body 102 and valve 108, the preferred technique is for the upper end 110 of the needle valve 108 to have a coaxial inlet passage 112 and lateral ports 114 passing to the exterior of the valve, into annulus 105. Inlet fitting 116 has a central bore 132 of varying diameter, coaxial with the bore 112 of the needle valve. The lower end 118 of the fitting abuts the upper end of the needle valve 108, providing a stop for the upper or retracted position of the valve. This occurs when a solenoid or coil assembly 120 energizes the associated electro magnet to lift the upper end 110 of the needle valve within the recess 122. Upon deenergization of the coil, the return spring 124 pushes the needle valve 108 downwardly into sealing engagement with a sealing face 126 at the lower end of the body 102. This closed condition prevents fluid in the annulus 105 from discharging through the orifice 128 and, likewise, retraction of the valve opens the sealing face and permits the fluid to be discharged into the exhaust stream of pipe 12. Coil 120 is supplied with DC current via connector 134.

The upper end of the fitting 116 provides the inlet port 130 for receiving pressurized fluid from segment 20c of the urea source line. This pressurized fluid passes through the central bore 132, including through the space surrounding the return spring 124, into the passage 112 at the upper end of the valve 108 and through the ports 114 and into the annulus 105 surrounding the lower portion of the needle valve 108. Preferably, one or two enlarged regions 151 on the needle valve 108, provide guidance through the bore 104.

The injector 100 is mounted to the exterior wall of the exhaust pipe 12, such that the discharge orifice 128 is at the surface elevation or within the pipe 12. The pipe 12 may include an externally threaded rim or the like (not shown), and the injector may have an internally threaded coupling or fitting (not shown) for engaging the rim.

A swirl element is provided in the lower portion of the injector body, below the valve seating surface, for inducing a swirling flow to the treatment liquid before it passes through the discharge orifice 128, thereby delivering a swirling atomized spray into the exhaust pipe. An effective swirling, atomized discharge is achieved from a static initial condition of the treatment liquid in the annulus above the seating surface.

Figure 3:
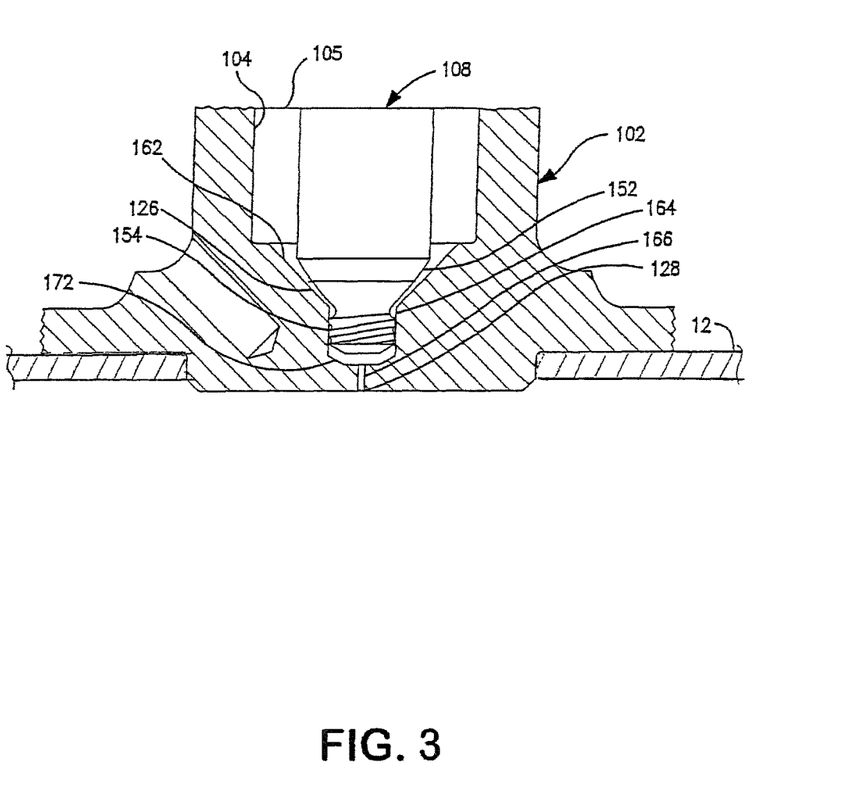
FIG. 3 is an enlarged view of the lower region of the injector, showing a first embodiment of a swirl element, extending from the nose of the needle valve.
Figure 4:
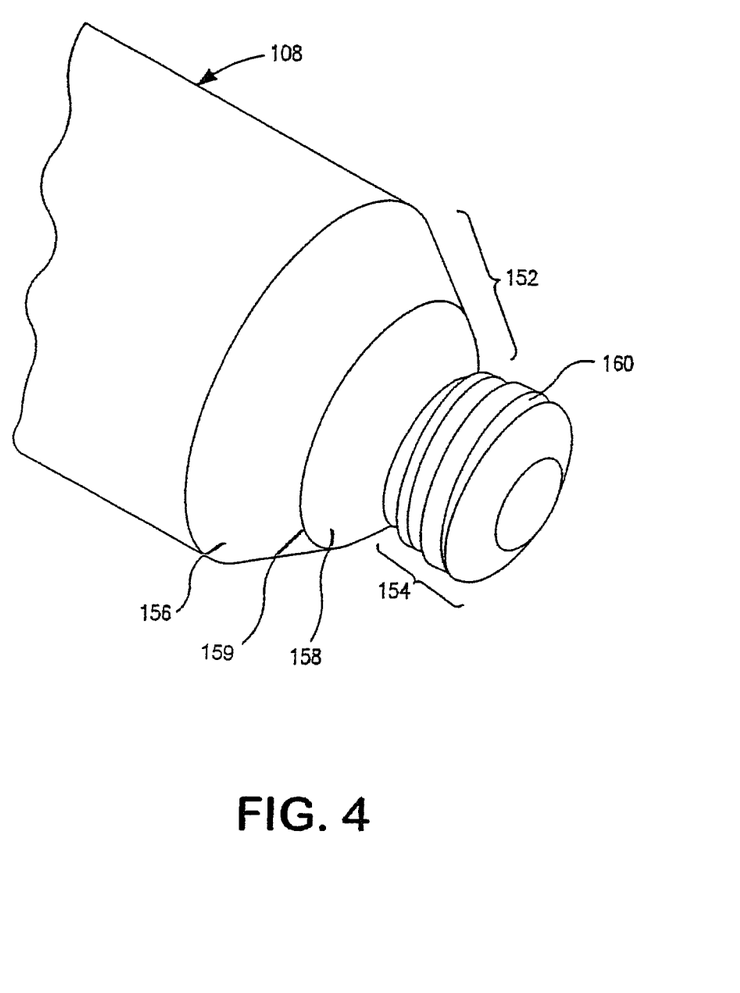
FIG. 4 is an enlarged view of the nose of the needle valve of FIG. 3, showing the swirl element as an integral extension with helical exterior grooves.

As shown in FIGS. 3 and 4, the elongated body 102 has a central bore 104, in which the needle valve 108 reciprocates. The lower end or nose 152 of the valve is doubly conical, with a first, upper face 156 tapering at a first angle and second, lower face 158 tapering more quickly toward the axis. The transition forms a sealing circle 159 for engaging the sealing face 126 on the inwardly tapered conical surface 162 at the lower end of the body. The lower end of surface 162 leads to a substantially cylindrical chamber 164.

The control system selectively moves the valve 108 downwardly into a closed condition whereby the nose 152 seals against the seat 126 on the face 162 and upwardly into an open condition whereby the nose lifts from the seat. A swirl element 154 extends, preferably entirely, from the nose 152 below the seal line 159 and seat 126. A passage, in this case the annulus 105, supplies treatment fluid to the surface 162 upstream of the seat, whereby when the valve nose 152 is seated in the closed condition, no fluid can enter the chamber 164 and when the valve nose is lifted off the face, fluid flows through the helical grooves 160 of swirl element 154 into a space 172 at the bottom of the chamber 164, forming a whirl in the space before exiting through discharge orifice 128 as an atomized whirling spray.

Preferably, as shown in FIG. 2, the inlet to the body is at the top, directed coaxially into the bore to form a static, pressurized column around the annulus 105 above the seat 126 when the valve is closed, but it should be appreciated that a supply passage could penetrate the bore transversely at any elevation above the valve seat.

With the swirl element 154 having an outer diameter substantially equal to the inner diameter of the chamber 164, substantially all the pressurized treatment liquid can be discharged only after passing through the single or multiple helical groove patterns of the external grooves 160. The swirl element extends only part way into the chamber, leaving a whirl space 172 immediately above a narrow bore or the discharge port 166. This swirl is maintained in the whirl space 172 and is likewise maintained as the liquid passes through the discharge port 166. The insulating ring 136 is situated at the discharge end of the body and has an outwardly tapered central passage 168 coaxial with the discharge orifice 128. The narrow port 166 produces a high pressure in the liquid such that upon discharge at the orifice 128, a broad, substantially conically whirling, atomized spray is delivered through the ring to the exhaust.

Figure 5:
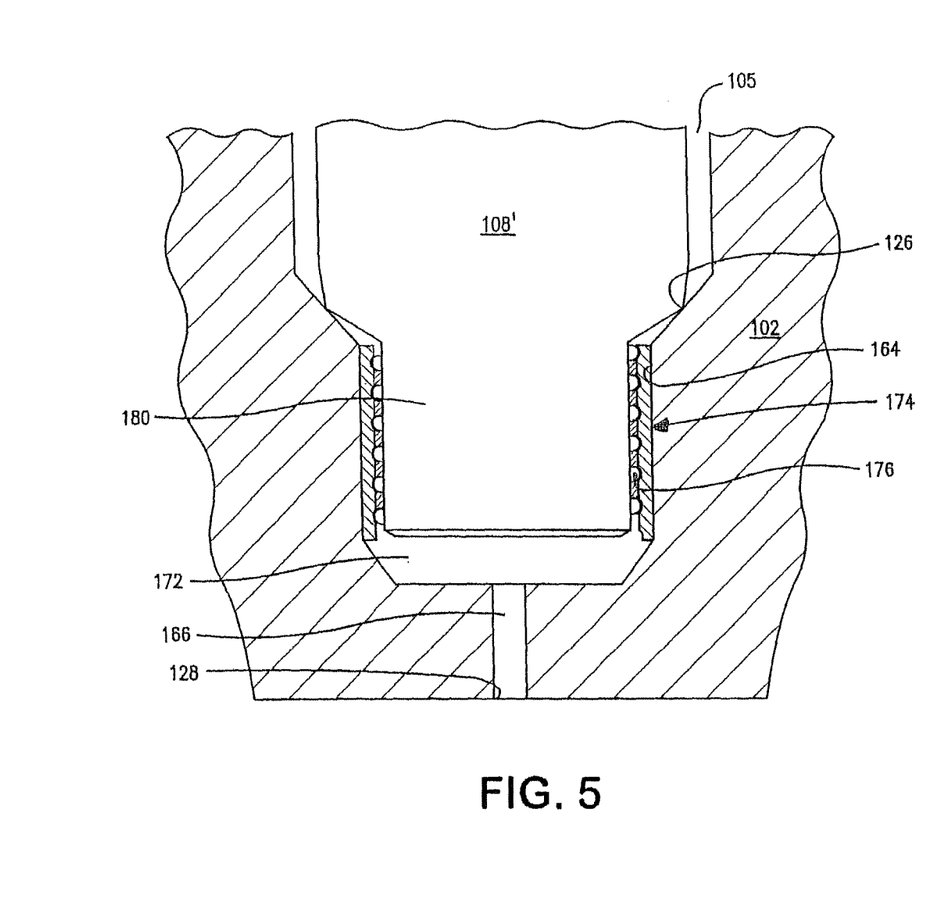
FIG. 5 shows an alternative embodiment, in which a hollow swirl element is press fit into the body below the valve sealing face.

FIG. 5 shows another embodiment, in which the swirl element 174 is situated in the chamber 164, below the seat 126, and has internal single or multiple helical groove patterns 176. The grooves could alternatively be present in the internal wall of the chamber, without the need for an insert. In this embodiment, the nose of the valve 108' would have a substantially solid, cylindrical extension 180 in close conformance with the swirl element 174. As with the previously described embodiment, due to the close conformance, substantially all the treatment liquid must pass through only the grooves, thereby establishing a swirl in the free space 172 below the swirl element, before passing through the discharge port 166 and out the discharge orifice 128.

Figure 6:
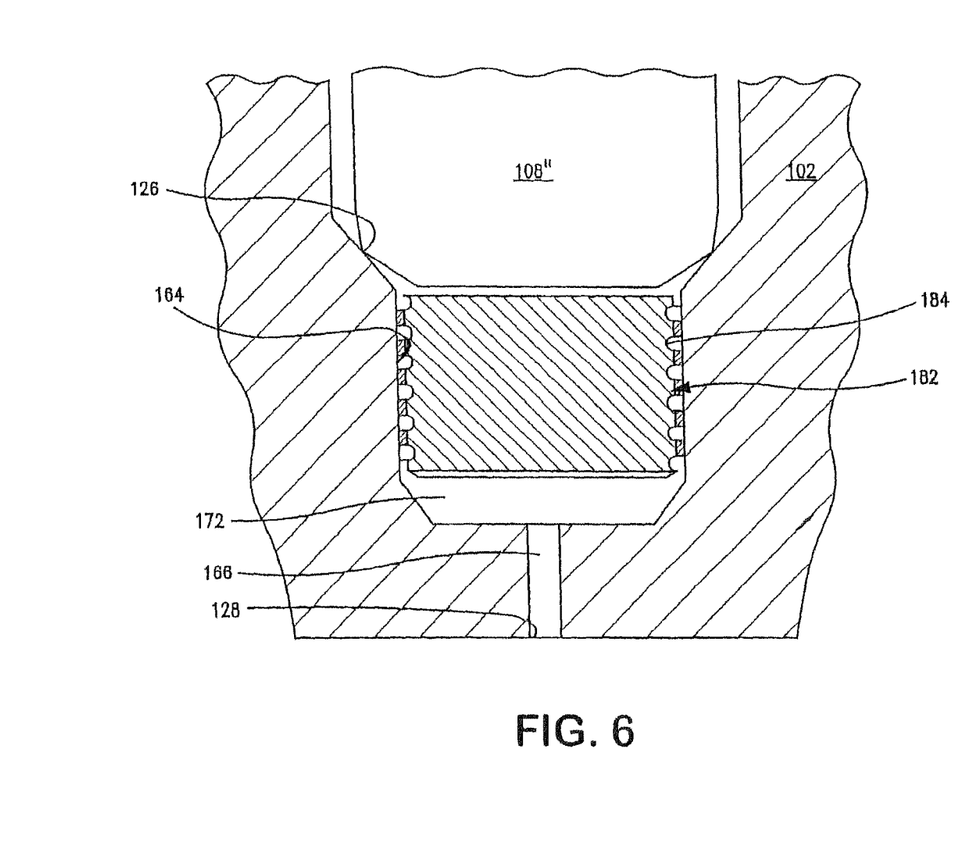
FIG. 6 shows another embodiment in which a solid swirl element is press fit into the body below the sealing face.

FIG. 6 shows a third embodiment, in which the swirl element 182 is a solid cylindrical insert with single or multiple helical groove patterns 184 on the exterior. As with the grooves on extension 154 shown in FIG. 4, the outside diameter closely conforms to the internal wall diameter of the chamber, but the insert is an immoveable plug. The pressurized liquid must pass through the grooves to be discharged. The valve 108" does not have an integral extension.

Figure 7:
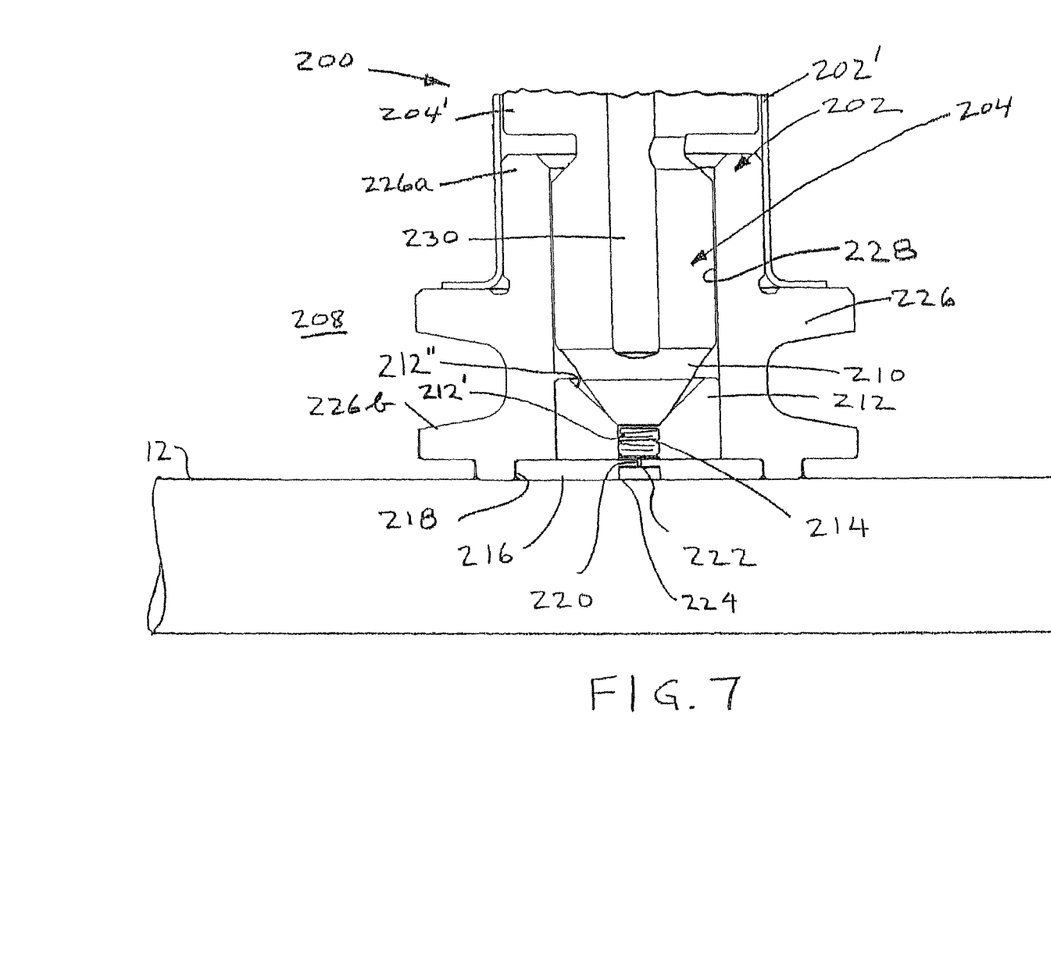
FIG. 7 shows another embodiment in which the valve seat is a distinct component.

Another embodiment 200 is shown in FIG. 7. As with the previously described embodiment, the injector body 202 with central bore extends downwardly with the needle valve 204 coaxially situated in the bore. The valve nose 210 confronts a conical surface formed in a separate and distinct seat member 212 of the body, and a swirl element 214 having a single or multiple helical groove pattern is press fit in the cylindrical chamber at the center of the seat member 212. This swirl element and its relationship to the valve 204, chamber 212' below the conical seating surface 212", whirl space, and discharge flow path are preferably as shown in FIG. 6. However, this embodiment has the distinct seat member 212, which rests on a circular platform 216.

The platform 216 is press fit or otherwise secured in an annular socket 218 at the lower end of the body 202. The platform 216 has a centrally located discharge port 220 and discharge orifice 222 from which the atomized spray exits as a narrow cone of swirling spray. A spray guide or similar enlarged or enlarging surface 224 can immediately follow the discharge orifice 222. In this embodiment, the surface 224 is cylindrically formed in the platform 216, but such surface could be conical and formed as a connection to or extension of the platform.

Seat member 212 and platform 216 are rigidly connected to the lower end 226 of the body 202 and thus functionally equivalent to the lower portion of the unitary body in the embodiment of FIG. 6, in which the valve seat 126, chamber 164, discharge port 166 and discharge orifice 128 are machined into a solid body. With the embodiment of FIG. 7, manufacturing is simplified in that the lower portion 226 of the body has a simple through bore 228 with a diameter closely conforming to the outer diameter of the valve portion 204 immediately above the nose 210, and a simple, shallow counter bore at 218.

Furthermore, the lower portion 226 of the body can be a distinct part that is rigidly connected to an upper body or casing 202', which can have a larger bore diameter to accommodate a larger diameter portion 204' of the valve. This further simplifies manufacture, especially if the valve has a different diameter adjacent the nose 210, than at the upper end. The liquid supply passage 230 to the nose is preferably a longitudinal channel along the inside diameter of the valve with cross-holes, for delivery of pressurized fluid to the conical surface of seat member 212.

Even if the body member 226 is distinct and not unitary with other guide structure 202' for the upper portion 204' of the valve, it along with the rigidly attached seat member 212 and platform 216 can be considered as a longitudinal body having a central bore and upper and lower ends 226a, 226b, the lower end having a substantially conical internal face 212" narrowing to a chamber 212'. The swirl element 214 is located in this chamber, below the sealing line where the nose 210 closes flow against the seating face.

The lower portion 226 of the body can have a variety of shapes, and can be quite simple. For use of the injector in exhaust gas treatment systems, a flange, nut, or other fastener means is connected to either the lower end of the body or to the bottom wall of the jacket, for mounting the injector to the exhaust conduit (as shown for example in FIG. 2).

Figure 8:
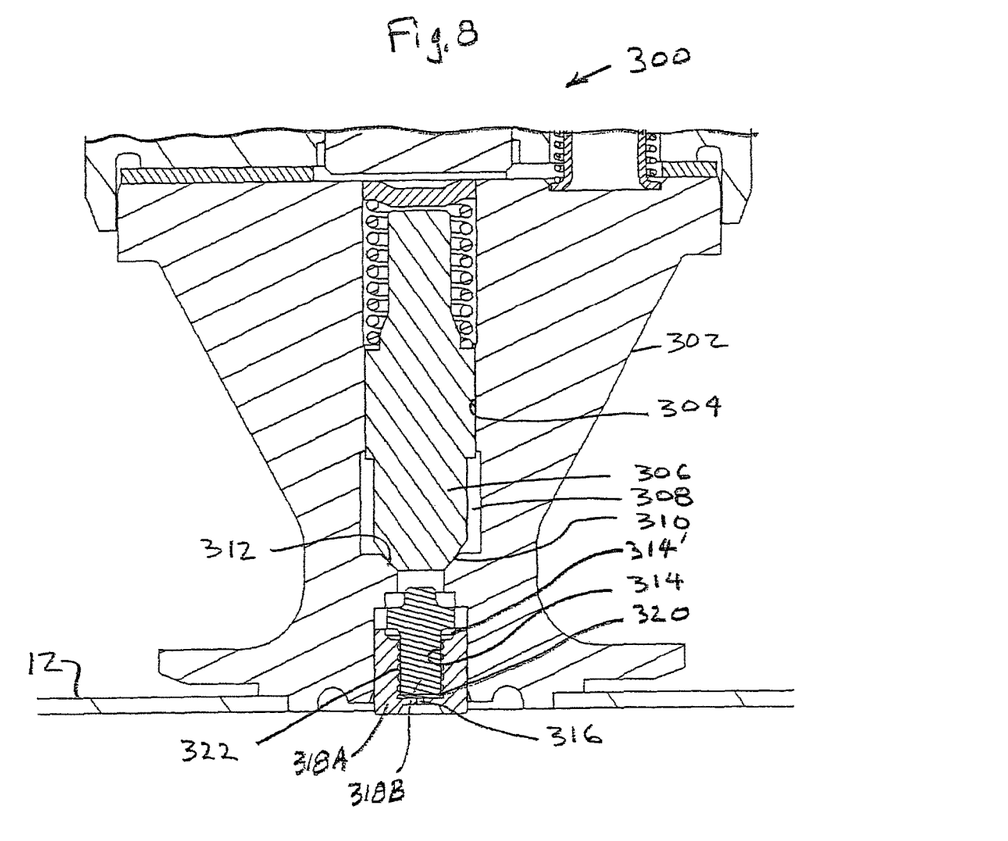
FIG. 8 is a sectional view of another embodiment of the lower portion of an injector, containing the injection nozzle with swirl element.

FIG. 8 shows another embodiment of the lower portion of an injector 300 as mounted on an exhaust pipe 12. The body or housing 302 includes a central bore 304 with a needle valve 306 situated in the bore, having a moveable sealing face 310 selectively seated against a stationary sealing face 312. A pump or similar device provides pressurized treatment liquid to the source volume 308 immediately upstream of the seating surfaces 310, 312. A swirl chamber 314 is in selective fluid communication with the source volume 308, via the valve 306. As in the previous embodiments, a control system selectively moves the valve 306 into a closed condition whereby the moveable face 310 seals against the stationary face 312 and into an open condition whereby the moveable face lifts from the stationary face. In the present embodiment, the body 302 is counterboard at the lower end, such that the chamber 314 is defined within a swirl element 318A press fit or otherwise secured to the body. A plug 318B is fixed within the chamber 314, in this instance via an annular flange or shoulder pinned between the swirl element 318A and a counter shoulder in the counter bore of the body. Flow passages are provided either in the shoulder or through the plug 318B.

When the valve 306 opens, liquid under pressure in the volume 308 passes around or partially through the plug 318B where it enters the chamber 314, preferably via a tapered annular region 314'. The flow passes through the single or multiple helix flow channels 322 formed in this embodiment on the wall of chamber 314, while confined by the outer diameter of the cylindrical portion of plug 318B. As in the previously described embodiments, after passing through the flow channels, the liquid enters free space 320 where a whirl is formed before exiting through port 316.

In the three other embodiments 400, 500, and 600 shown in FIGS. 9-13, the common features include a body 402, 502, 602 and central bore 404, 504 and 604 with a valve assembly 406, 506, and 606, for controlling flow from a source volume 408, 508, and 608 of pressurized fluid. Each has a plate or disc type valve, with a moveable disc valve member 410, 510, 610 and circular seat 412, 512, 612 fixed with respect to the body.

Figure 9:
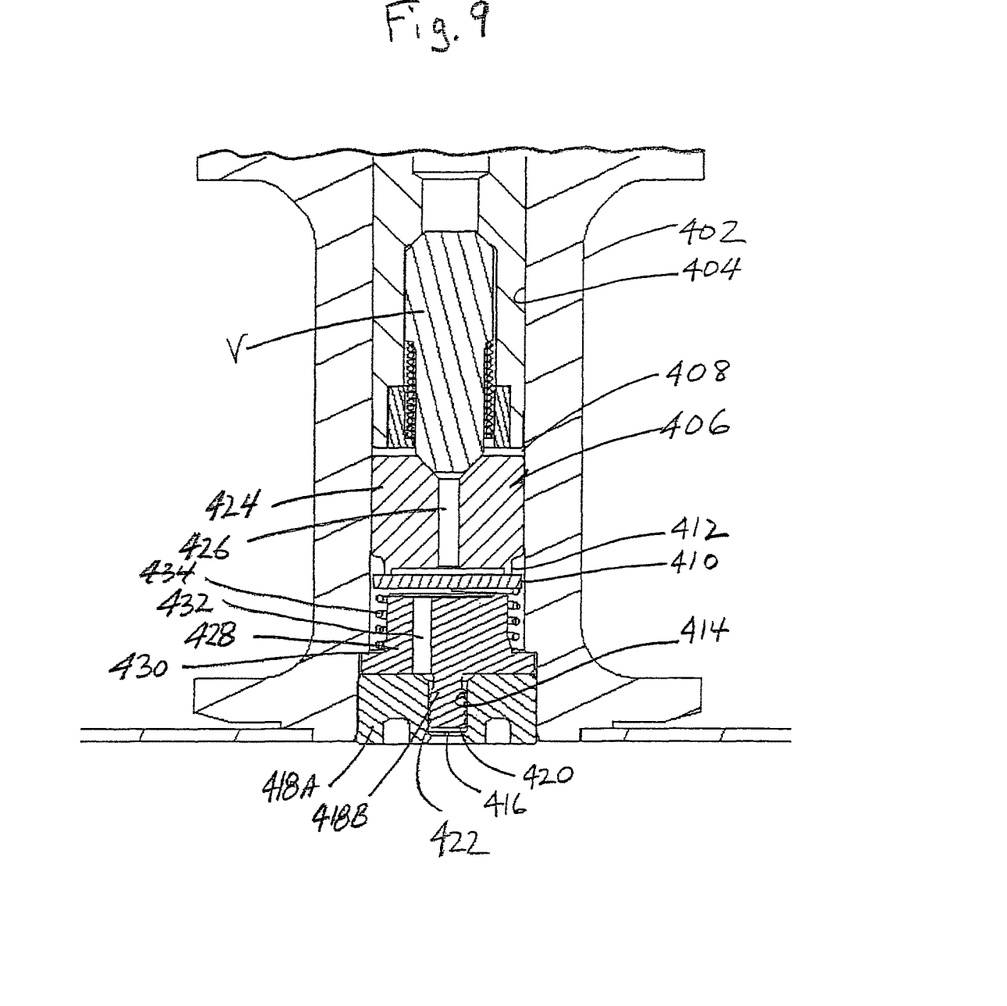
FIG. 9 is a sectional view similar to FIG. 8 of another embodiment of the injector nozzle region.

With particular reference to the embodiment of FIG. 9, a fixed insert 418A defines the chamber 414, in this instance having a smooth cylindrical wall. The swirl flow channels 422 are formed as single or multiple helical grooves on the exterior of the plug portion 418B in fixed position within the chamber. The discharge port 416 and free space 420 are provided as in the other embodiments.

The valve in this embodiment is formed in part by a valve insert 424 fixed with respect to the body 402 and having a central flow passage 426 from the pressurized source volume 408. The moveable valve portion 410 is associated with a spring seat insert 428 having a shoulder 430 which rests on the chamber insert 418A and which provides a seat for spring 434. The spring 434 biases the valve member 410 into the closed position against the seat 412. In this embodiment, when the valve opens, flow passes through passage 426, around the disc 410 into another flow passage 432 in the spring seat insert 428, to enter the transition annulus. All the flow passes the grooves 422 on the outer surface of the plug portion 418B. It can be seen that the plug portion 418B in this embodiment is an integral projection from the spring seat 428 into the swirl chamber 414.

Figures 10, 11:
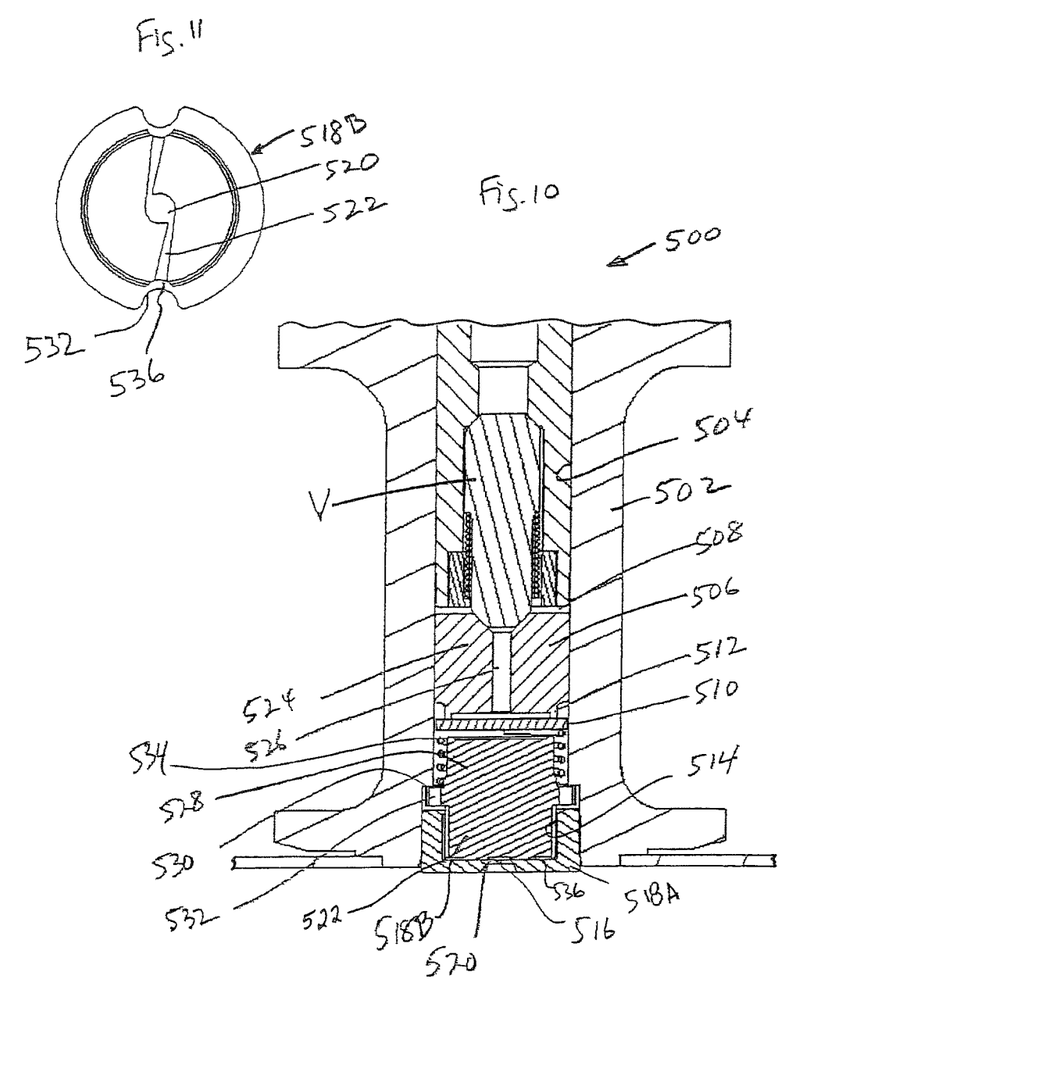
FIGS. 10 and 11 are section and bottom views, respectively, of yet another embodiment.

FIGS. 10 and 11 show another embodiment in which the structures corresponding to the structures in FIG. 9 carry the same numeric identifier, but in a 500 series rather than a 400 series. In this embodiment, the swirl element 518A more closely resembles a cup with smooth cylindrical inner wall, and the plug portion 518B also has a smooth external cylindrical wall, providing a flow annulus whereby pressurized fluid can pass through the cutouts or notches 532 on the shoulder or flange 530 of the spring seat insert 528. In this embodiment, the flow channels that produce the standing swirl in the space 520, are provided by formations at the bottom of the plug 518B in the form of peripheral notches 536 leading to slots 522 and a central substantially cylindrical region 520. Thus, in this embodiment, the fluid passageway as defined by the spring seat insert is an annulus around the spring seat insert. At least one slot 522 is required, but generally a plurality would be preferred. The slots narrow in cross section as they extend radially inward to the space 520.

Figures 12, 13:
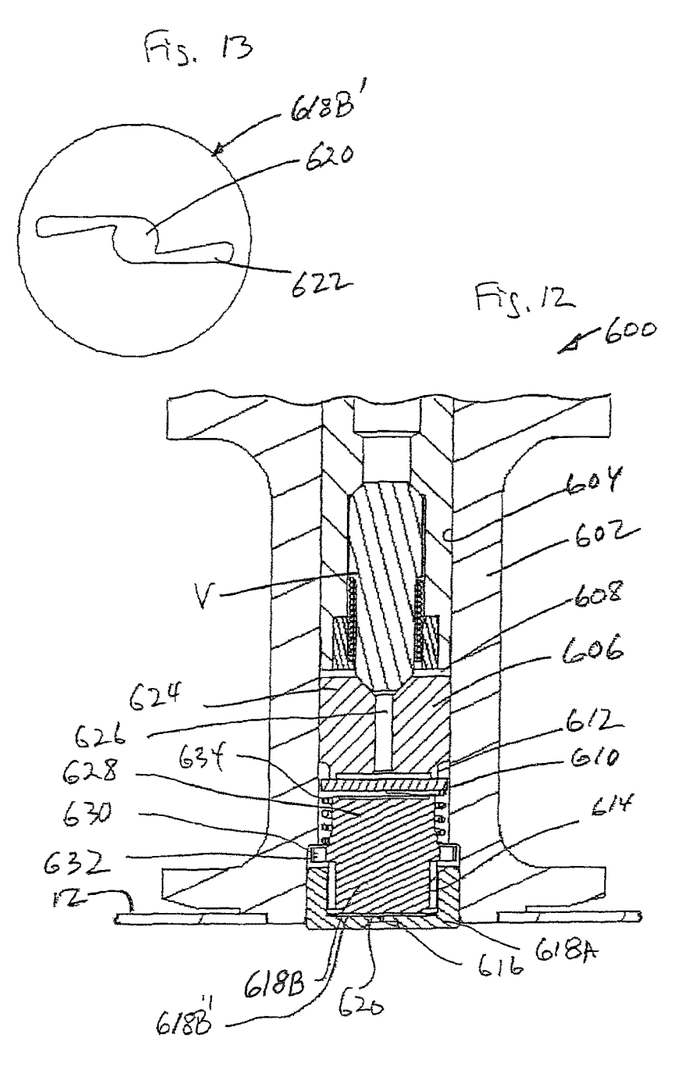
FIGS. 12 and 13 are section and bottom views of a final embodiment.

In the embodiment of FIGS. 12 and 13, the overall components and functionality are similar to those of FIG. 10, except that the slots 622 and central space 620 are provided in a distinct disc 618B' located at the flat bottom of the plug portion 618B of spring seat 628. With the disc sitting on the flat bottom of the chamber insert 618A, trapped between the plug and the chamber bottom, the space 620 is defined by a cylindrical opening in the center of the disc leading to the port 616.

Optionally, the components associated with actuating the valve assemblies 406, 506, and 606 can include a needle type check valve V that seats against a conical transition on insert 424, 524, 624 to prevent leakage when the engine is turned off and which during operation is lifted off the seating surface to open flow into passage 426, 526, 626.

The preferred combination of features of these embodiments includes (1) a swirl element below the valve sealing face; (2) which element produces a helical flow confined in flow channels in a chamber; (3) upon exiting the flow channels the flow consolidates as a swirl in a free space; (4) the liquid leaves the free space through a narrow passage while maintaining a swirl; and (5) the fluid is discharged through the outlet of the passage or similar orifice as a whirling, atomized spray. The swirl element can be a combination of cooperating components and can be defined in part by the wall or floor of the chamber or plug within the chamber. Thus, "swirl element" should be understood a referring to a feature, not necessarily a distinct component.

The invention claimed is:

1. An injector comprising:
   a longitudinal body;
   a central bore in the body, having upper and lower ends and a source volume for receiving pressurized fluid to be injected;
   a valve situated in the bore, having a moveable sealing face selectively seated against a stationary sealing face;
   a chamber in selective fluid communication with the source volume through said valve;
   a control system that selectively moves the valve member into a closed condition whereby said moveable face seals against said stationary face and into an open condition whereby the moveable face lifts from said stationary face;
   a discharge port from the chamber to a discharge orifice;
   a swirl element situated in the chamber, while leaving a free space in the chamber immediately above the discharge port;
   whereby when the valve is in said closed condition, no fluid can enter said chamber from the source volume and when the valve is in said open condition, pressurized fluid flows into said chamber, through said swirl element into said space, forming a whirl in said space before passing through said discharge port and exiting said discharge orifice as an atomized whirling spray;
   further comprising
   a generally cup shaped insert (518A, 618A) having a side wall and a bottom wall, located at and fixed with respect to the bottom of the bore, defining a cylindrical (514, 614) chamber below the valve seat and a single discharge orifice (516, 616) from the chamber at the bottom wall, coaxial with the bore;
   a generally cylindrical plug (528, 628) coaxially situated within the insert, having a side wall spaced radially from the sidewall of the insert and defining a flow passage (514, 614) between the insert and the plug, and a bottom adjacent the bottom of the insert;
   at least two radially oriented slots (522, 622) between the bottom of the plug and the bottom of the insert, each slot having an outer portion in fluid communication with said flow passage (514, 614) between the insert and the plug and narrowing toward the axis of the plug; and
   a cylindrical space (520, 620) between the bottom of the plug and the bottom of the insert in direct fluid communication with the discharge orifice (516, 616),
   wherein the slots and cylindrical space are formed in the bottom of the plug.

2. An injector comprising:
   a longitudinal body;
   a central bore in the body, having upper and lower ends and a source volume for receiving pressurized fluid to be injected;
   a valve situated in the bore, having a moveable sealing face selectively seated against a stationary sealing face;
   a chamber in selective fluid communication with the source volume through said valve;
   a control system that selectively moves the valve member into a closed condition whereby said moveable face seals against said stationary face and into an open condition whereby the moveable face lifts from said stationary face;
   a discharge port from the chamber to a discharge orifice; and
   a swirl element situated in the chamber, while leaving a free space in the chamber immediately above the discharge port;
   whereby when the valve is in said closed condition, no fluid can enter said chamber from the source volume and when the valve is in said open condition, pressurized fluid flows into said chamber, through said swirl element into said space, forming a whirl in said space before passing through said discharge port and exiting said discharge orifice as an atomized whirling spray; further comprising a generally cup shaped insert (518A, 618A) having a side wall and a bottom wall, located at and fixed with respect to the bottom of the bore, defining a cylindrical (514, 614) chamber below the valve seat and a single discharge orifice (516, 616) from the chamber at the bottom wall, coaxial with the bore; and a generally cylindrical plug (528, 628) coaxially situated within the insert, having a side wall spaced radially from the sidewall of the insert and defining a flow passage (514, 614) between the insert and the plug, and a bottom adjacent the bottom of the insert;

wherein the plug has a lower portion spaced from the sidewall of the insert for defining said flow passage, an upper portion extending above the insert, and a flange extending radially over the sidewall of the insert;

a spring bearing on the flange to urge the plug toward the bottom of the insert; and flow openings in the flange leading to said flow passage between the plug and the insert.

* * * * *